United States Patent
Kerger

[19]

[11] Patent Number: 5,947,444
[45] Date of Patent: Sep. 7, 1999

[54] GAS TAP

[75] Inventor: Léon Kerger, Helmdange, Luxembourg

[73] Assignee: Luxembourg Patent Company S.A., Luxembourg

[21] Appl. No.: 09/021,037

[22] Filed: Feb. 9, 1998

[30] Foreign Application Priority Data

Feb. 24, 1997 [LU] Luxembourg ............................. 90 029

[51] Int. Cl.[6] .................................................. F16K 37/00
[52] U.S. Cl. .............................. 251/228; 251/84; 251/87; 251/215
[58] Field of Search ................................. 251/228, 298, 251/215, 84, 87; 137/854

[56] References Cited

U.S. PATENT DOCUMENTS

| | | | |
|---|---|---|---|
| 1,968,779 | 7/1934 | Johnsen | 251/87 |
| 3,175,573 | 3/1965 | Vater | 251/87 |
| 3,472,481 | 10/1969 | Spies | 251/85 |
| 4,550,749 | 11/1985 | Krikorian | 137/854 |

*Primary Examiner*—A. Michael Chambers
*Assistant Examiner*—Bryan Wallace
*Attorney, Agent, or Firm*—Leydig, Voit & Mayer, Ltd.

[57] ABSTRACT

The tap comprises an external operating element and a connecting stem for transmitting the movement of the operating element to the opening and closure member which is arranged in such a way as to be pressed against the sealing seat under the effect of the pressure of the gas. To make opening against the pressure of the gas easier, the connecting stem and/or the opening and closure member are designed in such a way that the opening of the tap comprises a first phase in which the opening and closure member pivots, followed by a movement of the axial translation.

3 Claims, 1 Drawing Sheet

5,947,444

GAS TAP

FIELD OF THE INVENTION

The present invention relates to a gas tap comprising a body with an internal opening and closure member interacting with a sealing seat, an external operating element, and a connecting stem for transmitting the movement of the operating element to the opening and closure member.

BACKGROUND OF THE INVENTION

The invention is more particularly targeted at taps which have to meet the strictest safety criteria and which need to be easily operable such as, for example, taps for gas bottles used in the hospital environment. For safety reasons, it is desirable for the closure member of these taps to be arranged in such a way that it is urged in the direction of closure by the pressure of the gas. This means, however, that in order to open the tap, it is necessary to overcome the force exerted by the pressure of the gas on the closure member. The force required to open the tap can thus become very high when the pressure of the gas in the bottle is high. Put another way, the ease of operation and the very strict safety rules are not always criteria that can be readily reconciled.

The purpose of the present invention is to provide a novel gas tap, especially for high-pressure bottles, which is readily operable and which meets the strictest safety criteria.

SUMMARY OF THE INVENTION

In order to achieve this objective, the invention proposes a tap of the kind described hereinabove which is characterized in that the opening and closure member is arranged in such a way as to be held against the sealing seat under the effect of the operating element and the pressure of the gas and in that the connecting stem and/or the opening and closure member are designed in such a way that the opening of the tap comprises a first phase in which the opening and closure member pivots, followed by a movement of axial translation.

The initial pivoting phase serves to establish a limited opening between the opening and closure member and thus immediately to balance the pressure across the opening and closure member. The force needed to make the opening member pivot in this way is far lower than the one needed to lift it off its seat, keeping it parallel. As soon as the pressure is balanced, there is then no longer any resistance to opening from the pressure of the gases.

According to a first embodiment, the connecting stem is slightly bent so that the direction of the thrusting force makes an angle with the axis of the sealing seat.

According to a second embodiment, the sealing member has the end of the connecting stem passing through it and is borne thereby, leaving a certain clearance, while the thrusting force on the opening and closure member is offset from the axis of the sealing seat. This offset thrust can be brought about by an oblique shoulder on the stem immediately above the opening and closure member.

These and other aims, objectives, and features of the present invention will become more apparent from the following detailed description when taken in conjunction with the accompanying drawings.

BRIEF DESCRIPTION OF THE DRAWINGS

Other features and characteristics of the invention will emerge from the detailed description of two advantageous embodiments given hereinbelow by way of illustration with reference to the appended drawings in which.

Figure 1:
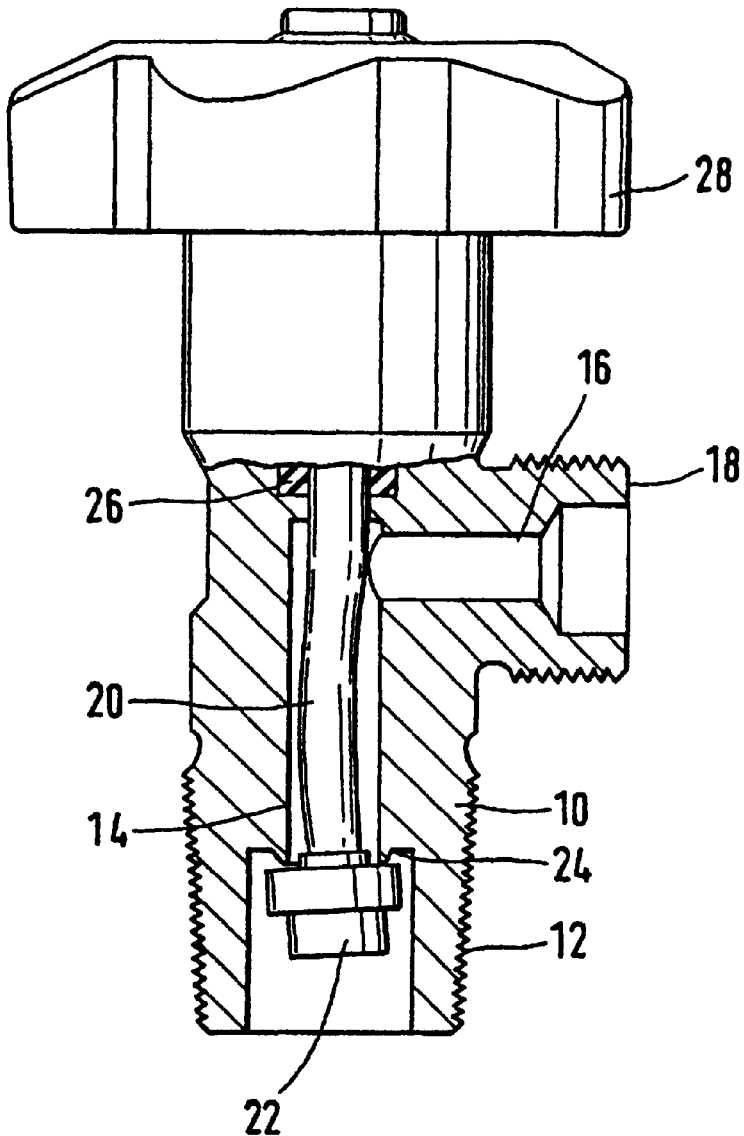
FIG. 1 depicts a view in axial part section of the first embodiment of a tap according to the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

The tap depicted in FIG. 1 comprises a body 10, for example made of metal, the lower part of which has a screw thread 12 allowing it to be screwed on to a gas bottle, not depicted. The body 10 has an axial passage 14 passing through it, this passage communicating with a radial outlet passage 16 passing through a connector 18 to which a user circuit, not shown, can be connected.

The axial passage 14 has passing through it a stem 20, the lower end of which carries an opening and closure member 22 which interacts with a sealing seat 24 surrounding the lower end of the passage 14. The axis of the seat 24 and of the passage 14 is represented by A. Given that the seat 24 is located above the closure member 22, the latter is urged in the closed position onto the seat 24 by the pressure of the gas. Thus, when, by accident, the tap breaks above the bottle, no gas can leak.

The upper part of the stem 20 passes through a gland 26 which provides sealing against the outside when the tap is open. The stem 20 is shifted axially by turning an operating handwheel 28.

As can be seen in FIG. 1, the stem 20 is slightly bent, the curvature having, however, been exaggerated in the figure to make it more visible. Thus, at the time of opening, the direction of the thrusting force on the opening and closure member makes an angle, admittedly a very small one, with the axis A of the passage 14. This angle is enough to lift the member 22 obliquely off its seat 24 and thus create a limited local opening that can be seen on the left-hand side between the seat 24 and the opening and closure member 22. This opening, as soon as it is formed, immediately allows the pressure across the closure and opening member 22 to be balanced.

The stem 20 moreover has a certain flexibility to allow it, upon closure, to give slightly under the effect of the tension, in order to press the opening and closure member flat on to the seat 24.

Figure 2:
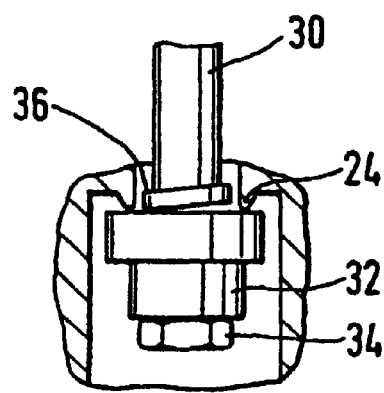
FIG. 2 depicts a part view of a second embodiment.

In the embodiment according to FIG. 2, the connecting stem 30 is arranged axially, that is to say that its axis is coincident with the axis A of the seat 24. The lower end of the stem 30 passes through the opening and closure member 32 which may be held in place by means of a nut 34 screwed on to the stem 30.

The opening and closure member 32 is mounted with a certain amount of clearance on the stem 30, it being possible for this clearance perhaps to increase from the bottom upwards, to allow the member 32 a certain pendular movement with respect to the stem 30.

Immediately above the member 32, the stem 30 moreover has a flange or shoulder 36 which is oblique with respect to the opening and closure member 32. As a result of this, upon opening, the downwards movement of the stem 30 exerts an offset thrust which has the effect that the opening and closure member 32, thanks to its mounting clearance, tends to position itself slightly at an angle with respect to the stem 30 and to form a small localized limited opening, like in the case of FIG. 1, to allow the pressure to be balanced immediately.

Upon closure, the axial movement of the stem 30, thanks to the retaining nut 34, allows the opening and closure member 32 to be pressed very flat on its seat 24.

What is claimed is:

1. A gas tap comprising a body with an internal opening and closure member interacting with a sealing seat, an external operating element, and a connecting stem for transmitting the movement of the operating element to the opening and closure member, wherein the opening and closure member is arranged in such a way as to be held against the sealing seat on the effect of the operating element and the pressure of the gas, and in that the connecting stem and/or the opening and closure member are designed in such a way that the opening of the tap comprises a first phase in which the opening and closure member pivots, followed by a movement of axial translation, wherein the connecting stem is slightly bent so that the direction of the thrusting force makes an angle with the axis of the sealing seat.

2. A gas tap comprising a body with an internal opening and closure member interacting with a sealing seat, an external operating element, and a connecting stem for transmitting the movement of the operating element to the opening and closure member, wherein the opening and closure member is arranged in such a way as to be held against the sealing seat under the effect of the operating element and the pressure of the gas, and in that the connecting stem and/or the opening and closure member are designed in such a way that the opening of the tap comprises a first phase in which the opening and closure member pivots, followed by a movement of axial translation, wherein the opening and closure member has the end of the connecting stem passing through it and is borne thereby, leaving a certain clearance, and in that the thrusting force acts on the opening and closure member at a point which is offset from the axis of the sealing seat.

3. The tap according to claim 2, wherein the stem has an oblique shoulder immediately above the opening and closure member.

\* \* \* \* \*